United States Patent
Tan et al.

(10) Patent No.: US 12,175,809 B2
(45) Date of Patent: Dec. 24, 2024

(54) REMOTE AUTOMOBILE DIAGNOSTIC METHOD AND APPARATUS, AND COMPUTER DEVICE

(71) Applicant: THINKCAR TECH CO., LTD., Guangdong (CN)

(72) Inventors: Bin Tan, Guangdong (CN); Wei Zhang, Guangdong (CN); Juehua Huang, Guangdong (CN)

(73) Assignee: THINKCAR TECH CO., LTD., Shenzhen (CN)

( * ) Notice: Subject to any disclaimer, the term of this patent is extended or adjusted under 35 U.S.C. 154(b) by 469 days.

(21) Appl. No.: 17/546,034

(22) Filed: Dec. 8, 2021

(65) Prior Publication Data

US 2023/0058631 A1    Feb. 23, 2023

(30) Foreign Application Priority Data

Aug. 20, 2021    (CN) .......................... 202110962422.7

(51) Int. Cl.
G07C 5/08    (2006.01)
G07C 5/00    (2006.01)
H04L 65/1069    (2022.01)

(52) U.S. Cl.
CPC ........... G07C 5/0808 (2013.01); G07C 5/008 (2013.01); H04L 65/1069 (2013.01)

(58) Field of Classification Search
CPC ... G07C 5/0808; G07C 5/008; H04L 65/1069; H04L 67/125; G05B 23/0221
See application file for complete search history.

(56) References Cited

U.S. PATENT DOCUMENTS

| | | | |
|---|---|---|---|
| 2003/0138475 A1* | 7/2003 | Chen .................. | G06Q 10/06 424/435 |
| 2009/0062978 A1* | 3/2009 | Picard ................ | G06Q 30/0611 701/31.4 |
| 2016/0217630 A1* | 7/2016 | Hua ..................... | G07C 5/008 |

(Continued)

FOREIGN PATENT DOCUMENTS

| CN | 101834879 A | 9/2010 |
|---|---|---|
| CN | 105137964 A | 12/2015 |

(Continued)

*Primary Examiner* — Jaime Figueroa
*Assistant Examiner* — Madison B Emmett

(57) ABSTRACT

Disclosed are a remote automobile diagnostic method and apparatus, and a computer device. The method is applicable to a device side. A remote connection is established to a target terminal, and parameter information of a to-be-diagnosed automobile is transmitted to the target terminal, so that the to-be-diagnosed automobile can be directly diagnosed by the target terminal side. During the establishment of the remote connection to the target terminal, a second connection request signal may be transmitted to an operating terminal, to establish a remote connection to the operating terminal, so that the operating terminal can remotely control the device side and indirectly remotely diagnose the to-be-diagnosed automobile. That is, remote diagnosis is performed on the to-be-diagnosed automobile by two remote terminals. In this way, the efficiency of the remote diagnosis on the to-be-diagnosed automobile by the remote terminals can be enhanced.

17 Claims, 3 Drawing Sheets

(56) References Cited

U.S. PATENT DOCUMENTS

| | | | | |
|---|---|---|---|---|
| 2018/0151003 A1* | 5/2018 | Grobler | ............. | G06F 16/90335 |
| 2018/0162301 A1* | 6/2018 | Meng | ................. | G07C 9/00309 |
| 2018/0286146 A1* | 10/2018 | Liu | ......................... | H04W 4/40 |
| 2018/0293811 A1* | 10/2018 | Liu | ....................... | G07C 5/0808 |
| 2019/0322298 A1* | 10/2019 | Mong | ................... | B61L 23/005 |
| 2021/0005031 A1* | 1/2021 | Brauer | ................. | G07C 5/0841 |
| 2021/0014318 A1* | 1/2021 | Xiao | ....................... | H04L 67/01 |

FOREIGN PATENT DOCUMENTS

| | | | |
|---|---|---|---|
| CN | 105847178 | A | 8/2016 |
| CN | 109164791 | A | 1/2019 |
| CN | 109993850 | A | 7/2019 |
| CN | 110687894 | A | 1/2020 |
| CN | 212964037 | U | 4/2021 |

\* cited by examiner

REMOTE AUTOMOBILE DIAGNOSTIC METHOD AND APPARATUS, AND COMPUTER DEVICE

CROSS REFERENCE TO RELATED APPLICATION

This application claims priority from Chinese patent application No. 202110962422.7 filed on Aug. 20, 2021, the content of which is hereby incorporated by reference.

TECHNICAL FIELD

This application relates to the field of automobile diagnosis technologies, and in particular, to a remote automobile diagnostic method and apparatus, and a computer device.

BACKGROUND

The automobile diagnosis technology has existed since the automobiles emerged. However, with the rapid development of the automobile technology and the increasing complexity of automobile configurations, automobile servicemen and fault diagnosis technicians are required to possess increasingly high professional skills, and diagnosis instruments are becoming complex and specialized. This requires not only very high maintenance funds, but also increasingly high professional qualifications of practitioners. High-standard 4S shops, high-standard chain repair shops, and high-end car clubs cannot be popularized in high density, and small repair shops of varying quality are unable to provide high-quality and high-level maintenance and repair work. An effective way to resolve the problem is remote automobile diagnosis. Faulty automobiles are diagnosed and treated by means of a remote connection to a remote automobile diagnosis instrument. However, during actual faulty automobile diagnosis, a different automobile has a complicated and varying fault. Therefore, the remote automobile diagnosis instrument may fail to analyze a fault cause of an automobile. In addition, a diagnosis result of a single automobile diagnosis instrument has low accuracy. As a result, the efficiency of remote automobile diagnosis is degraded.

SUMMARY OF THE APPLICATION

An objective of the present application is to provide a remote automobile diagnostic method and apparatus, and a computer device, to resolve the technical problems that the existing remote diagnostic method lacks complete and accurate diagnosis results, and the low efficiency of the automobile diagnosis by remote terminals.

The present application provides a remote automobile diagnostic method. The method is applicable to a device side and includes:
  transmitting a first connection request signal to a target terminal to establish a remote connection to the target terminal;
  acquiring parameter information of a to-be-diagnosed automobile, and transmitting the parameter information to the target terminal, so that the target terminal diagnoses the to-be-diagnosed automobile according to the parameter information;
  transmitting a second connection request signal to an operating terminal to establish a remote connection to the operating terminal; and
  receiving a control signal transmitted by the operating terminal, and performing, a diagnosis action corresponding to the control signal, so that the operating terminal controls the device side according to the control signal.

Preferably, after receiving the control signal transmitted by the operating terminal, and performing a diagnosis action corresponding to the control signal, the method further includes:
  acquiring diagnosis data during a remote diagnosis of the to-be-diagnosed automobile by the target terminal according to the parameter information within a preset time period, and determining whether the target terminal is capable of completing the remote diagnosis of the to-be-diagnosed automobile according to the diagnosis data, where the diagnosis data includes a network delay value and a diagnostic communication protocol of the to-be-diagnosed automobile;
  receiving a diagnosis result fed back by the target terminal, if the target terminal is capable of completing the remote diagnosis of the to-be-diagnosed automobile, so that the target terminal completes the remote diagnosis of the to-be-diagnosed automobile; and
  disconnecting the remote connection to the target terminal, if the target terminal is incapable of completing the remote diagnosis of the to-be-diagnosed automobile.

Preferably, after transmitting a second connection request signal to the operating terminal to establish the remote connection to the operating terminal, the method further includes:
  transmitting real-time communication data to the operating terminal, where the real-time communication data consist of one or more of text data, picture data, voice data, and video data; and
  receiving instant communication information fed back by the operating terminal according to the real-time communication data to establish a remote communication connection to the operating terminal.

Preferably, the step of transmitting the first connection request signal to the target terminal to establish the remote connection to the target terminal includes:
  acquiring an online terminal list, where the online terminal list includes a plurality of online terminals;
  randomly selecting one online terminal from the online terminal list as the target terminal;
  transmitting connection request information to the target terminal;
  receiving order information fed back by the target terminal according to the connection request information, where the order information includes a basic automobile information acquisition request, and merchant information, fee information, and a connection address corresponding to the target terminal; and
  determining whether the order information conforms to a preset condition, and establishing the remote connection to the target terminal according to the connection address corresponding to the target terminal if the order information conforms to the preset condition; or
  returning to the step of randomly selecting one online terminal from the online terminal list as the target terminal if the order information does not conform to the preset condition.

Preferably, the step of acquiring the diagnosis data during the diagnosis of the to-be-diagnosed automobile by the target terminal according to the parameter information within the preset time period, and determining, according to the diagnosis data, whether the target terminal is capable of completing the remote diagnosis of the to-be-diagnosed automobile includes:

acquiring a network delay value of the remote connection to the target terminal within the preset time period;

determining whether the network delay value is greater than a preset delay threshold;

determining that the remote network connection to the target terminal is unstable if the network delay value is greater than the preset delay threshold;

acquiring the diagnostic communication protocol followed by the to-be-diagnosed automobile, and determining whether the diagnostic communication protocol is a preset communication protocol; and determining that the target terminal is incapable of completing the remote diagnosis of the to-be-diagnosed automobile if the diagnostic communication protocol followed by the to-be-diagnosed automobile is the preset communication protocol and/or if the remote network connection to the target terminal is determined to be unstable.

Preferably, the step of transmitting the second connection request signal to the operating terminal to establish the remote connection to the operating terminal includes:

acquiring a session address and a communication address;

transmitting the session address and the communication address to the operating terminal;

receiving remote response data fed back by the operating terminal according to the session address and the communication address; and establishing the remote connection to the operating terminal according to the remote response data.

Preferably, the step of receiving the control signal transmitted by the operating terminal, and performing the diagnosis action corresponding to the control signal includes:

receiving the control signal transmitted by the operating terminal, to obtain an adjustment instruction for the to-be-diagnosed automobile;

performing, a diagnosis action corresponding to the adjustment instruction on the to-be-diagnosed automobile, where the diagnosis action includes selection of a diagnosis parameter and execution of a diagnosis event;

when the diagnosis action is the selection of the diagnosis parameter, selecting a corresponding diagnosis parameter or option on a display interface of the device side;

when the diagnosis action is the execution of the diagnosis event, transmitting a diagnosis instruction corresponding to the execution of the diagnosis event to the to-be-diagnosed automobile; and acquiring a diagnosis result of the to-be-diagnosed automobile to complete the diagnosis of the to-be-diagnosed automobile.

This application further provides a remote automobile diagnostic apparatus. The apparatus includes:

a first establishment module, configured to transmit a first connection request signal to a target terminal to establish a remote connection to the target terminal;

a first acquisition module, configured to acquire parameter information of a to-be-diagnosed automobile, and transmit the parameter information to the target terminal, so that the target terminal diagnoses the to-be-diagnosed automobile according to the parameter information;

a second establishment module, configured to transmit a second connection request signal to an operating terminal to establish a remote connection to the operating terminal; and a control module, configured to receive a control signal transmitted by the operating terminal, and perform a diagnosis action corresponding to the control signal, so that the operating terminal controls the device side according to the control signal.

This application further provides a computer device. The computer device includes a memory and a processor. The memory stores a computer program. When the processor executes the computer program, the steps of the above remote automobile diagnostic method are performed.

This application further provides a computer-readable storage medium. The computer-readable storage medium has a computer program stored thereon. When the computer program is executed by a processor, steps of the above remote automobile diagnostic method are performed.

Beneficial effects of this application are as follows. This application provides a remote automobile diagnostic method and apparatus, and a computer device. The method is applicable to a device side. A remote connection is established to the target terminal, and the parameter information of the to-be-diagnosed automobile is transmitted to the target terminal, so that the to-be-diagnosed automobile can be directly diagnosed by the target terminal side. During the establishment of the remote connection to the target terminal, the second connection request signal may be transmitted to the operating terminal, to establish a remote connection to the operating terminal, so that the operating terminal can remotely control the device side and indirectly remotely diagnose the to-be-diagnosed automobile. That is to say, by means of this application, remote diagnosis can be performed on the to-be-diagnosed automobile by two remote terminals. In this way, the accuracy of a diagnosis result and the diagnosis efficiency of the remote terminals can be enhanced.

Figure 1:
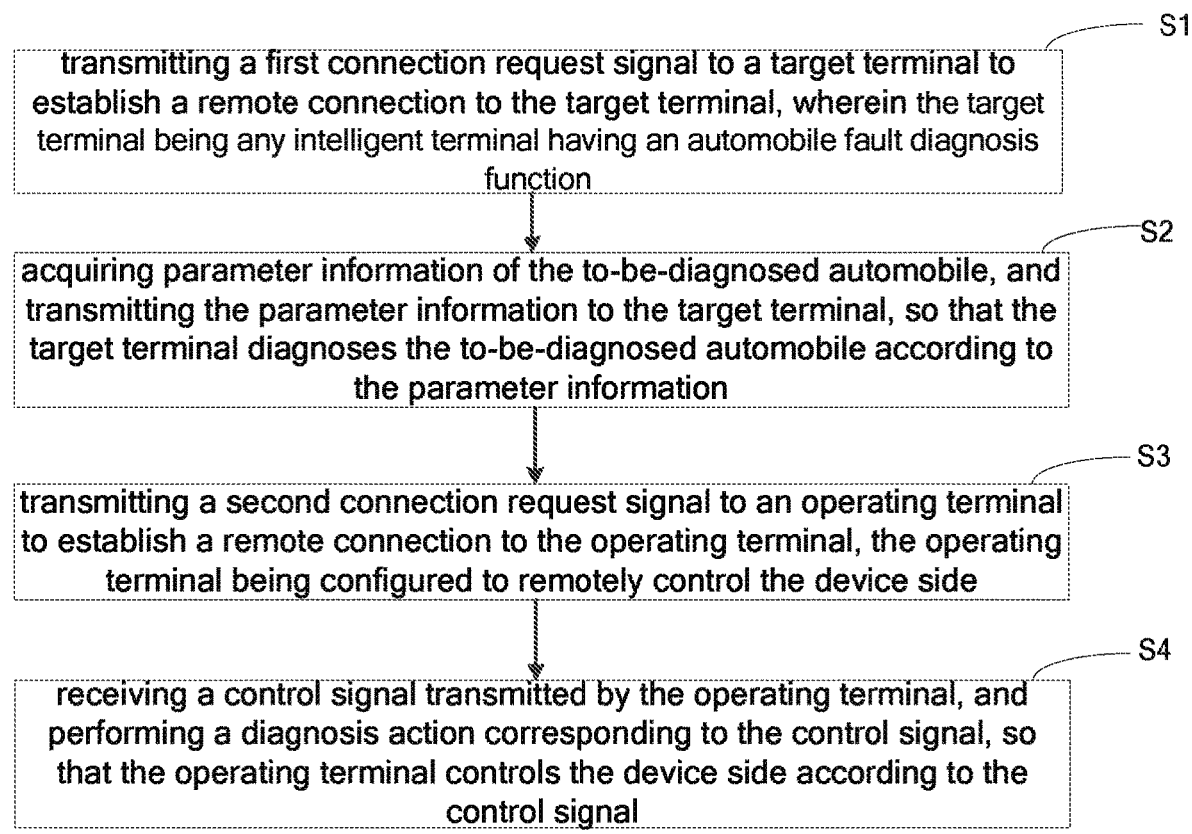
FIG. 1 is a flowchart of a remote automobile diagnostic method according to an embodiment of this application.
Figure 2:
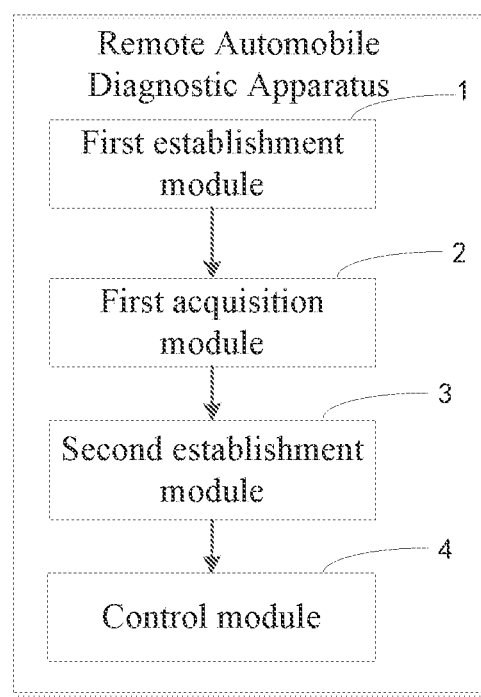
FIG. 2 is a schematic structural diagram of a remote automobile diagnostic apparatus according to an embodiment of this application.
Figure 3:
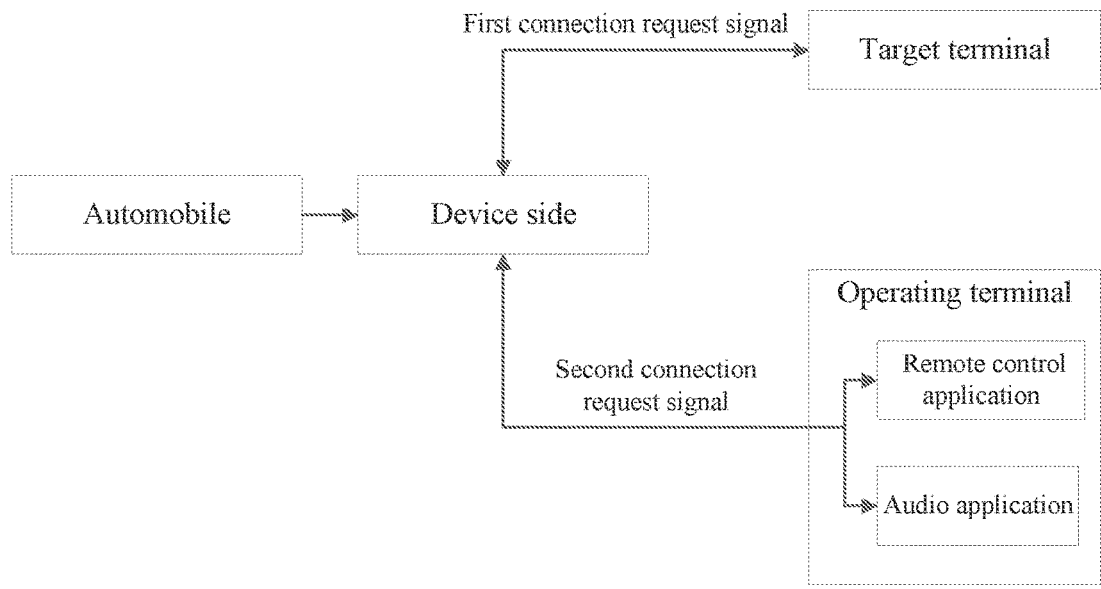
FIG. 3 is a schematic connection diagram of devices for remote automobile diagnosis according to an embodiment of this application.

The objective achievement, functional features, and advantages of this application are further described with reference to the embodiments and the accompanying drawings.

DETAILED DESCRIPTION OF THE EMBODIMENTS

It should be understood that the specific embodiments described herein are merely used to explain this application but are not intended to limit this application.

As shown in FIGS. 1 to 4, this application provides a remote automobile diagnostic method. The method is applicable to a device side and includes the following steps.

S1: transmitting a first connection request signal to a target terminal to establish a remote connection to the target terminal.

S2: acquiring parameter information of the to-be-diagnosed automobile, and transmitting the parameter information to the target terminal, so that the target terminal diagnoses the to-be-diagnosed automobile according to the parameter information.

S3: transmitting a second connection request signal to an operating terminal to establish a remote connection to the operating terminal.

S4: receiving a control signal transmitted by the operating terminal, and performing a diagnosis action corresponding to the control signal, so that the operating terminal controls the device side according to the control signal.

As described in the above step S1, the device side may be understood as an intelligent terminal integrated with an automobile fault diagnosis function and an instant communication function, such as an automobile fault diagnosis instrument. Conventional automobile fault diagnosis instruments generally include a dedicated automobile fault diagnosis instrument and a general automobile fault diagnosis instrument. The dedicated automobile fault diagnosis instrument is dedicatedly developed for a specific vehicle model, which can perform relatively complete diagnosis on the specific vehicle model. The general automobile fault diagnosis instrument can perform diagnosis for any vehicle model, but only for some aspects of automobiles. Therefore, in this application, a remote connection is established between the device side and the target terminal, so that the remote target terminal directly diagnoses the automobile, enhancing the efficiency of the automobile fault diagnosis by the device side. For example, the device side may be the general automobile fault diagnosis instrument. When the general automobile fault diagnosis instrument cannot diagnose some aspects of the automobile, the general automobile fault diagnosis instrument may be remotely connected to the target terminal. The target terminal may be the dedicated automobile fault diagnosis instrument or a server capable of fault diagnosis. Therefore, by performing fault diagnosis on the automobile by the target terminal, a more accurate diagnosis result of the automobile can be achieved. For another example, the target terminal may be a simulation terminal that can simulate an automobile prototype through the remote connection. The simulation terminal may be connected to another automobile fault diagnosis instrument to directly diagnose the automobile according to the simulated automobile prototype. Definitely, the device side may also be a dedicated fault diagnosis instrument, or an intelligent terminal integrated with an automobile fault diagnosis function and an instant communication function, which is not uniquely limited herein.

As described in the above step S2, the device side may acquire the parameter information of the to-be-diagnosed automobile, and transmit the parameter information to the target terminal. The target terminal may perform fault diagnosis on the to-be-diagnosed automobile again based on the parameter information.

As described in the above steps S3 to S4, a different automobile has a different fault cause, and professional and experienced servicemen are insufficient to support the entire automobile repair market. In addition, in the prior art, when an automobile is to be repaired, an owner of the automobile needs to deliver the automobile to a repair shop, and then a serviceman chooses to perform on-site diagnosis or remote diagnosis. That is to say, fault diagnosis of the automobile still relies on a professional serviceman, and the owner of the automobile or the non-professional serviceman cannot perform fault diagnosis independently. In other words, after receiving an automobile diagnosis and repair recommendation report by using the automobile fault diagnosis instrument, the non-professional serviceman may be unable to complete the repair of the automobile independently as a result of a limited professional ability and limited experience. Therefore, the owner of the automobile or the non-professional serviceman has few options in the fault diagnosis of the automobile, that is, the fault diagnosis of the automobile is greatly limited. As a result, the repair costs and the repair time of the automobile are definitely increased, impeding the intelligent development of the automobile maintenance and repair industry. Due to the complex and varying fault causes of the to-be-diagnosed automobile, during the remote diagnosis by the target terminal according to the parameter information, the target terminal may fail to completely describe situations of the to-be-diagnosed automobile according to the received parameter information. Therefore, a diagnosis result may be different from a real situation. Therefore, during the diagnosis, the device side may transmit the second connection request signal to the operating terminal to establish the remote connection to the operating terminal. The operating terminal may be any computer device having a control function and a fault diagnosis function. In this way, during the remote diagnosis by the target terminal, the operating terminal may remotely directly control the device side, to directly learn specific situations of the to-be-diagnosed automobile from the device side. Therefore, the to-be-diagnosed automobile is simultaneously diagnosed by the target terminal and the operating terminal. Compared with single remote diagnosis, the diagnosis by the two remote terminals generates a more objective and accurate diagnosis result. It is to be noted that, the device side may also selectively establish the remote connection to either of the operating terminal or the target terminal according to the actual situation, or may preferably randomly and selectively establish the remote connection to the operating terminal or the target terminal. In this way, the device side has more options. Definitely, the device side may selectively establish the remote connection to both the operating terminal and the target terminal, which is not uniquely limited herein. By remotely connecting the device side to the operating terminal, this application is applicable to the owner of the automobile or the non-professional serviceman. That is to say, by means of the direct remote connection between the device side and the operating terminal, the owner of the automobile or the non-professional serviceman can learn the diagnosis of the automobile by viewing the device side. Therefore, the owner of the automobile or the non-professional serviceman can independently perform fault diagnosis on the automobile without relying on the professional serviceman. In this way, the limitation on the fault diagnosis of the automobile is greatly reduced, time costs and repair costs of the automobile are greatly reduced, and the intelligent development of the automobile maintenance and repair industry is enhanced.

In an embodiment, after step S4, the method further includes:

S5: acquiring diagnosis data during diagnosis of the to-be-diagnosed automobile by the target terminal within a preset time period, and determining, according to the diagnosis data, whether the target terminal is capable of completing the remote diagnosis of the to-be-diagnosed automobile, where the diagnosis data include a network delay value and a diagnostic communication protocol followed by the to-be-diagnosed automobile.

S6: receiving a diagnosis result fed back by the target terminal if the target terminal is capable of completing the remote diagnosis of the to-be-diagnosed automobile, so that the target terminal completes the remote diagnosis of the to-be-diagnosed automobile.

S7: disconnecting the remote connection to the target terminal if the target terminal is incapable of completing the remote diagnosis of the to-be-diagnosed automobile.

As described in the above step S5, a different fault spends a different diagnosis time. Therefore, the diagnosis data during the diagnosis of the to-be-diagnosed automobile by the target terminal within the preset time period may be acquired. Therefore, a status of the diagnosis of the to-be-diagnosed automobile by the target terminal may be determined according to the diagnosis data. In this way, when the remote connection between the target terminal and the device side is interrupted or the diagnosis goes wrong, the problem can be found in time and handled quickly.

As described in the above step S6, after the diagnosis status of the target terminal is determined according to the diagnosis data, if the target terminal can complete the remote diagnosis of the to-be-diagnosed automobile, the device side may receive a diagnosis result fed back by the target terminal, and generate a corresponding fault instruction according to the diagnosis result, so as to repair the automobile according to the fault instruction. In this way, the target terminal to completes the remote diagnosis of the to-be-diagnosed automobile.

As described in the above step S7, after the diagnosis status of the target terminal is determined according to the diagnosis data, if the target terminal cannot complete the remote diagnosis of the to-be-diagnosed automobile, the remote connection to the target terminal may be disconnected to reduce the time and manpower costs. In this case, the device side still establishes the remote connection to the operating terminal. Therefore, the device side can be controlled by the operating terminal to perform remote diagnosis on the to-be-diagnosed automobile.

In an embodiment, after step S3, the method further includes:

S31: transmitting real-time communication data to the operating terminal, where the real-time communication data consist of one or more of text data, picture data, voice data, and video data.

S32: receiving instant communication information fed back by the operating terminal according to the real-time communication data to establish a remote communication connection to the operating terminal.

As described in the above steps S31 to S32, the remote communication connection is established to the operating terminal. Therefore, during the diagnosis of the to-be-diagnosed automobile by the target terminal, the device side can directly exchange information with the operating terminal. Since the operating terminal can control the device side by using a control signal, when the operating terminal controls the device side, the device side may also transmit information, pictures, voice, and videos to the operating terminal, so that the operating terminal can instantly learn other objective information on the device side and the to-be-diagnosed automobile side, thereby improving the diagnosis efficiency of the operating terminal. Specifically, referring to FIG. 3, the device side may establish a remote connection to an application having a remote control function, such as a remote control application, and an application having a communication function, such as an audio application on the operating terminal, respectively by using two signal ends. Since the device side transmits different connection request signals to the target terminal and the operating terminal, the device side can establish the remote connection to the applications having the remote control function and the applications having the communication function respectively on both the target terminal and the operating terminal. The remote connections between the applications having the remote control function and the applications having the communication function on the target terminal and the operating terminal respectively and the device side are independent of each other. In this way, the operation suspension, crash, and shutdown of the device side can be avoided.

In an embodiment, step S1 includes:

S11: acquiring an online terminal list, where the online terminal list includes a plurality of online terminals.

S12: randomly selecting one online terminal from the online terminal list as the target terminal.

S13: transmitting connection request information to the target terminal.

S14: receiving order information fed back by the target terminal according to the connection request information, where the order information includes a basic automobile information acquisition request, and merchant information, fee information, and a connection address corresponding to the target terminal.

S15: determining whether the order information conforms to a preset condition, and establishing the remote connection to the target terminal according to the connection address corresponding to the target terminal if the order information conforms to the preset condition.

S16: returning to the step of randomly selecting one online terminal from the online terminal list as the target terminal if the order information does not conform to the preset condition.

As described in the above steps S11 to S16, in order to find a target terminal that most matches the to-be-diagnosed automobile, the online terminal list may be acquired in the display interface of the device side, and one online terminal is randomly selected from the online terminal list as the target terminal for remote connection. By receiving the order information fed back by the target terminal and comparing the order information with the preset condition, it may be determined whether the target terminal satisfies the requirements of the device side. For example, the fee information in the preset condition may be less than 1000 yuan, and a price in the order information fed back by the target terminal is 1200 yuan. In this case, another online terminal may be selected as the target terminal, and corresponding determination is then performed, until the target terminal conforming to the preset condition is found. For another example, automatic matching may be performed on the plurality of online terminals and the automobile according to an acquired automobile model. Online terminals matching the automobile model are retained, and unmatched online terminals are deleted. Definitely, the preset condition may also be the merchant information, a diagnosis time, or other conditions, which is not uniquely limited herein. By determining whether the target terminal conforms to the preset condition, it can be ensured that the remotely connected target terminal most matches the device side. More preferably, within the preset time period, after the plurality of online terminals diagnose the automobile, each diagnosis result may be stored and scored, so that the plurality of online terminals in the online terminal list can be prioritized according to the scores. In this way, during establishment of a next remote connection, an online terminal ranking first is preferably used. Therefore, the time for selecting the matched target terminal can be shortened. More preferably, after step S11 of acquiring the online terminal list, according to the online terminal list, a designated online terminal may be selected from the online terminal list as the target terminal.

In an embodiment, step S2 includes:

S21: establishing a communication connection to the to-be-diagnosed automobile.

S22: reading parameter data of the to-be-diagnosed automobile, and generating recognizable parameter information from the parameter data, where the parameter information includes electronic control system information and basic information.

S23: transmitting the parameter information to the target terminal, so that the target terminal diagnoses the to-be-diagnosed automobile.

As described in the above steps S21 to S23, the communication connection to the to-be-diagnosed automobile may be established by means of an on-board diagnostic (OBD) interface, and the parameter data of the to-be-diagnosed automobile is read by means of the OBD automobile diagnosis interface. The parameter data includes the electronic control system information and the basic information. The electronic control system information includes working parameters of systems such as an engine, a catalytic converter, an oxygen sensor, and a fuel system as well as information such as a fault code of the automobile. The basic information may be a vehicle identification number (VIN) of the automobile. The parameter information of the to-be-diagnosed automobile is transmitted to the target terminal, so that the target terminal can directly perform fault diagnosis on the to-be-diagnosed automobile at the target terminal side based on the parameter information. After the target terminal completes the fault diagnosis of the to-be-diagnosed automobile, a diagnosis result is transmitted to the device side, so that the device side can directly repair the to-be-diagnosed automobile based on the diagnosis result from the target terminal.

In an embodiment, step S5 includes:

S51: acquiring one or more network delay values of the remote connection to the target terminal within the preset time period.

S52: acquiring a diagnostic communication protocol followed by the to-be-diagnosed automobile.

S53: using the plurality of network delay values and the diagnostic communication protocol as the diagnosis data, and determining whether the target terminal is capable of completing the remote diagnosis of the to-be-diagnosed automobile according to the diagnosis data.

As described in the above steps S51 to S53, since the target terminal is remotely connected to the device side by means of a connection address fed back by a server and/or the target terminal, an unstable network connection easily occurs after a long time passes. Since the target terminal diagnoses the to-be-diagnosed automobile according to the parameter information of the to-be-diagnosed automobile, during the diagnosis of the automobile by the target terminal, the device side cannot view the specific diagnosis status of the target terminal. Therefore, if the network becomes unstable or a data loss occurs during the diagnosis by the target terminal, the device side cannot perceive the problem in time. Therefore, in this application, the network delay values and the diagnostic communication protocol followed by the to-be-diagnosed automobile within the preset time period are acquired as the diagnosis data, to help determine a current diagnosis status of the to-be-diagnosed automobile by the target terminal.

In an embodiment, step S53 includes:

S531: determining whether each network delay value is greater than a preset delay threshold value, and calculating a quantity of the network delay values in the plurality of network delay values that are greater than the preset delay threshold value.

S532: determining whether the quantity of the network delay values in the plurality of network delay values that are greater than the preset delay threshold value is greater than a preset number, and determining that the remote network connection to the target terminal is unstable if the quantity is greater than the preset number.

S533: acquiring the diagnostic communication protocol followed by the to-be-diagnosed automobile, and determining whether the diagnostic communication protocol is a preset communication protocol.

S534: determining that the target terminal is incapable of completing the remote diagnosis of the to-be-diagnosed automobile if the diagnostic communication protocol followed by the to-be-diagnosed automobile is the preset communication protocol and/or if the remote network connection to the target terminal is determined to be unstable.

As described in the above steps S531 to S534, by determining whether the remote connection between the device side and the target terminal is stable and whether the to-be-diagnosed diagnostic communication protocol is the preset communication protocol, it may be determined whether the target terminal is incapable of completing the remote diagnosis of the to-be-diagnosed automobile. For example, when the network delay value reaches 80 ms, the network delay value is determined as high. If the network delay value reaches 80 ms for a plurality of times within a period of time, it may be determined that a current network state is unstable. Therefore, it is determined that the current network state fails to support the target terminal to complete the diagnosis of the to-be-diagnosed automobile. For another example, since a different automobile follows a different diagnostic communication protocol, if the acquired diagnostic communication protocol followed by the to-be-diagnosed automobile is the Keyword Protocol 2000 (KWP2000), but the target terminal has no permission to diagnose the automobile following the diagnostic communication protocol of KWP2000, it may be determined that the target terminal is incapable of completing the diagnosis of the to-be-diagnosed automobile. Definitely, the target terminal may also have no diagnosis permission for other diagnostic communication protocols, for example, the unified diagnostic services (UDS), which is not uniquely limited herein.

In an embodiment, step S3 includes:

S31: acquiring a session address and a communication address.

S32: transmitting the session address and the communication address to the operating terminal.

S33: receiving remote response data fed back by the operating terminal according to the session address and the communication address.

S34: establishing the remote connection to the operating terminal according to the remote response data.

As described in the above steps S31 to S34, the session address and the communication address of the device side are transmitted to the operating terminal, so that the operating terminal can input the session address and the communication address to a system of the operating terminal to establish the remote network connection to the device side. Specifically, the operating terminal may use a web page link or an application to establish the network connection to the device side. More preferably, the operating terminal may select, according to the session address and the communication address of the device side, an application matching the device side to establish the remote network connection to the device side, and feed back the remote response data to the device side. In this way, the state of the network between the device side and the operating terminal can be relatively stable, thereby avoiding problems such as interruption and network delay of the remote connection between the operating terminal and the device side caused by the network.

In an embodiment, after step S7, the method further includes:

S701: acquiring a current network delay value.

S702: determining whether to continue to use the target terminal to perform diagnosis according to the current network delay value.

As described in the above steps S701 to S702, after the remote connection to the target terminal is disconnected, the current network delay value may be acquired to determine whether to continue to use the target terminal to perform diagnosis. If the target terminal is continued to use to perform diagnosis, the target terminal may selectively continue to perform diagnosis from a position where the network is disconnected or to perform the diagnosis again. In this way, the remote diagnosis is more flexible, and the serviceman can select adaptive solutions according to requirements.

In an embodiment, step S4 includes:

S41: receiving the control signal transmitted by the operating terminal to obtain an adjustment instruction for the to-be-diagnosed automobile.

S42: performing a diagnosis action corresponding to the adjustment instruction on the to-be-diagnosed automobile, where the diagnosis action includes selection of a diagnosis parameter and execution of a diagnosis event.

S43: selecting a corresponding diagnosis parameter or option on a display interface of the device side when the diagnosis action is the selection of the diagnosis parameter, and transmitting a diagnosis instruction corresponding to the execution of the diagnosis event to the to-be-diagnosed automobile when the diagnosis action is the execution of the diagnosis event.

S44: acquiring a diagnosis result of the to-be-diagnosed automobile to complete the diagnosis of the to-be-diagnosed automobile.

As described in the above steps S41 to S44, the remote connection to the operating terminal is established, the control signal transmitted by the operating terminal is received, the adjustment instruction is obtained based on the control signal, and the diagnosis action corresponding to the adjustment instruction is performed. Specifically, when the diagnosis action is the selection of the diagnosis parameter, the corresponding diagnosis parameter or option is selected on the display interface of the device side, and when the diagnosis action is the execution of the diagnosis event, the diagnosis instruction corresponding to the execution of the diagnosis event is transmitted to the to-be-diagnosed automobile. That is to say, the operating terminal directly controls the display interface of the device side, to complete the remote diagnosis of the automobile by the operating terminal using the device side. The operating terminal controls the device side, so that the device side can directly display a diagnosis status of the operating terminal. In this way, the serviceman using the device side can learn the diagnosis mode of the operating terminal.

This application further provides a remote automobile diagnostic apparatus. The apparatus includes:

a first establishment module 1, configured to transmit first connection request signal information to a target terminal to establish a remote connection to the target terminal;

a first acquisition module 2, configured to acquire parameter information of a to-be-diagnosed automobile, and transmit the parameter information to the target terminal, so that the target terminal diagnoses the to-be-diagnosed automobile according to the parameter information;

a second establishment module 3, configured to transmit a second connection request signal to an operating terminal to establish a remote connection to the operating terminal; and a control module 4, configured to receive a control signal transmitted by the operating terminal, and perform a diagnosis action corresponding to the control signal, so that the operating terminal controls the device side according to the control signal.

In an embodiment, the remote automobile diagnostic apparatus further includes:

a second acquisition module, configured to acquire diagnosis data during diagnosis of the to-be-diagnosed automobile by the target terminal within a preset time period, and determine whether the target terminal is capable of completing the remote diagnosis of the to-be-diagnosed automobile according to the diagnosis data, where the diagnosis data includes a network delay value and a diagnostic communication protocol followed by the to-be-diagnosed automobile;

a diagnosis module, configured to receive a diagnosis result fed back by the target terminal if the target terminal is capable of completing the remote diagnosis of the to-be-diagnosed automobile, so that the target terminal completes the remote diagnosis of the to-be-diagnosed automobile; and a disconnection module, configured to disconnect the remote connection to the target terminal if the target terminal is incapable of completing the remote diagnosis of the to-be-diagnosed automobile.

In an embodiment, the remote automobile diagnostic apparatus further includes:

a communication module, configured to transmit real-time communication data to the operating terminal, where the real-time communication data consist of one or more of text data, picture data, voice data, and video data; and a communication connection establishing module, configured to receive instant communication information fed back by the operating terminal according to the real-time communication data to establish a remote communication connection to the operating terminal.

In an embodiment, the first establishment module 1 includes:

a third acquisition module, configured to acquire an online terminal list, where the online terminal list includes a plurality of online terminals;

a selection module, configured to randomly select one online terminal from the online terminal list as the target terminal;

a request module, configured to transmit connection request information to the target terminal;

a receiving module, configured to receive order information fed back by the target terminal according to the connection request information, where the order information includes a basic automobile information acquisition request, and merchant information, fee information, and a connection address corresponding to the target terminal;

a first determination module, configured to determine whether the order information conforms to a preset condition, and establish the remote connection to the target terminal according to the connection address corresponding to the target terminal if the order information conforms to the preset condition; and a returning module, configured to return to the selection module if the order information does not conform to the preset condition.

In an embodiment, the first acquisition module 2 includes:

a first establishment unit, configured to establish a communication connection to the to-be-diagnosed automobile;

a first reading unit, configured to read parameter data of the to-be-diagnosed automobile, and generate recognizable parameter information from the parameter data, where the parameter information includes electronic control system information and basic information; and a first transmitting unit, configured to transmit the parameter information to the target terminal, so that the target terminal diagnoses the to-be-diagnosed automobile.

In an embodiment, the second acquisition module includes:

a first acquisition unit, configured to acquire one or more network delay values of the remote connection to the target terminal within the preset time period;

a second acquisition unit, configured to acquire a diagnostic communication protocol followed by the to-be-diagnosed automobile; and a first determination unit, configured to use the plurality of network delay values and the diagnostic communication protocol as the diagnosis data, and determine whether the target terminal is capable of completing the remote diagnosis of the to-be-diagnosed automobile according to the diagnosis data.

In an embodiment, the first determination unit includes:

a first determination sub-unit, configured to determine whether each network delay value is greater than a preset delay threshold value, and calculate a quantity of the network delay values that are greater than the preset delay threshold value in the plurality of network delay values;

a second determination sub-unit, configured to determine whether the quantity of the network delay values that are greater than the preset delay threshold value in the plurality of network delay values is greater than a preset number, and determine that the remote network connection to the target terminal is unstable if the quantity is greater than the preset number;

a third acquisition unit, configured to acquire the diagnostic communication protocol followed by the to-be-diagnosed automobile, and determine whether the diagnostic communication protocol is a preset communication protocol; and a determination unit, configured to determine that the target terminal is incapable of completing the remote diagnosis of the to-be-diagnosed automobile if the diagnostic communication protocol followed by the to-be-diagnosed automobile is the preset communication protocol and/or if the remote network connection to the target terminal is determined to be unstable.

In an embodiment, the second establishment module 3 includes:

a fourth acquisition unit, configured to acquire a session address and a communication address;

a second transmitting unit, configured to transmit the session address and the communication address to the operating terminal;

a first receiving unit, configured to receive remote response data fed back by the operating terminal according to the session address and the communication address; and a second establishment unit, configured to establish the remote connection to the operating terminal according to the remote response data.

In an embodiment, the control module 4 includes:

a second receiving unit, configured to receive the control signal transmitted by the operating terminal, to obtain an adjustment instruction for the to-be-diagnosed automobile;

an execution unit, configured to perform a diagnosis action corresponding to the adjustment instruction on the to-be-diagnosed automobile, where the diagnosis action includes selection of a diagnosis parameter and execution of a diagnosis event;

a selection unit, configured to select a corresponding diagnosis parameter or option on a display interface of the device side when the diagnosis action is the selection of the diagnosis parameter, and transmit a diagnosis instruction corresponding to the execution of the diagnosis event to the to-be-diagnosed automobile when the diagnosis action is the execution of the diagnosis event; and a fifth acquisition unit, configured to acquire a diagnosis result of the to-be-diagnosed automobile to complete the diagnosis of the to-be-diagnosed automobile.

Figure 4:
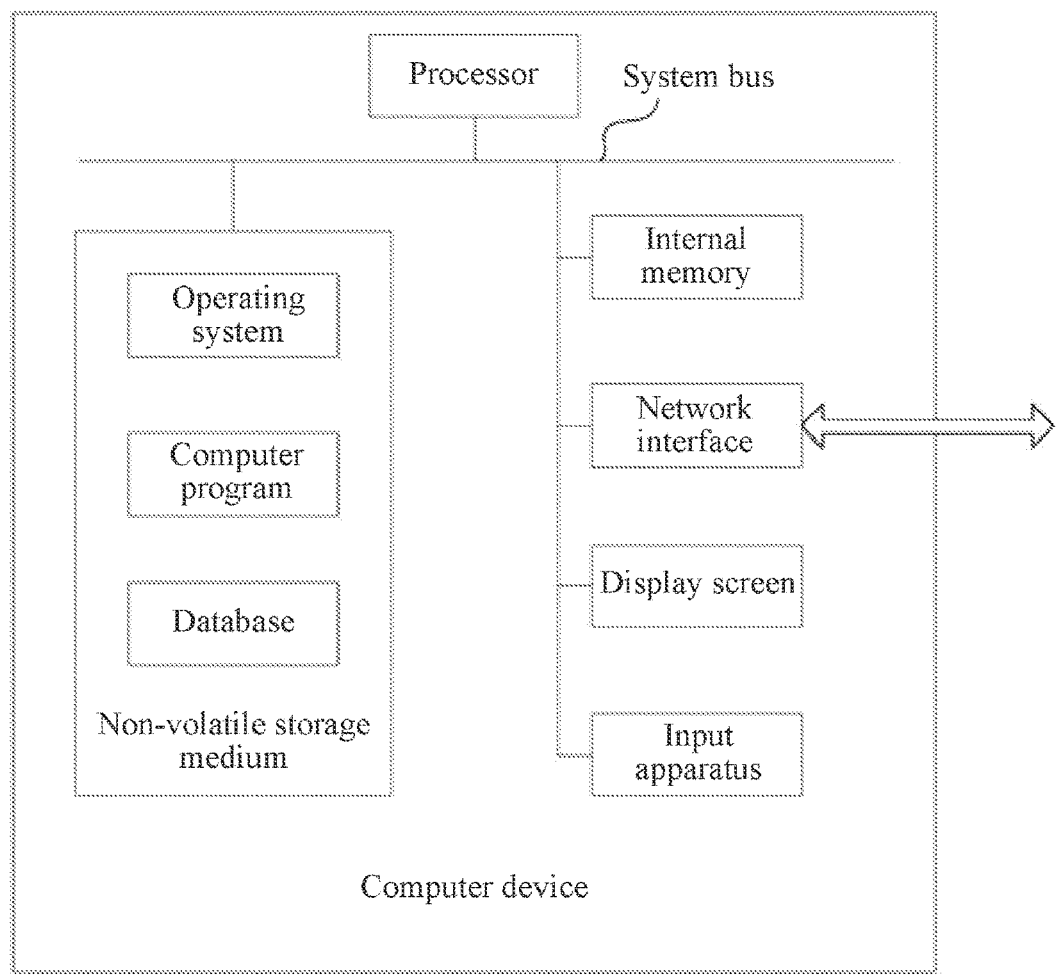
FIG. 4 is a schematic diagram of an internal structure of a computer device according to an embodiment of this application.

As shown in FIG. 4, this application further provides a computer device. The computer device may be a server. An internal structure of the computer device may be shown in FIG. 4. The computer device includes a processor, a memory, a network interface, and a database connected through a system bus. The processor of the computer device is configured to provide calculating and control abilities. The memory of the computer device includes a non-volatile storage medium and an internal memory. The non-volatile storage medium stores an operating terminal, a computer program, and a database. The internal memory provides environment for running the operating terminal and the computer program. The database of the computer device is configured to store all data needed during a process of the remote automobile diagnostic method. The network interface of the computer device is configured to connect to and communicate with an external terminal through a network. The computer program, when executed by a processor, implements the remote automobile diagnostic method.

A person skilled in the art may understand that the structure shown in FIG. 4 is only a block diagram of a partial structure related to a solution in this application, and does not constitute a limitation to the computer device to which the solution in this application is applied.

An embodiment of this application further provides a computer-readable storage medium, storing a computer program, the computer program, when executed by a processor, implementing any one of the above remote automobile diagnostic methods.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a dual data rate SDRAM (DDRSDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

It should be noted that, in this specification, the terms "include", "comprise", and any variants thereof are intended to cover a non-exclusive inclusion. Therefore, in the context of a process, apparatus, object, or method that includes a series of elements, the process, method, object, or apparatus not only includes such elements, but also includes other elements not specified expressly, or may include inherent elements of the process, apparatus, object, or method. Without more limitations, elements defined by the sentence "including one" does not exclude that there are still other same elements in the processes, apparatus, object, or method.

The foregoing descriptions are merely exemplary embodiments of this application and are not intended to limit this application. All equivalent structure and equivalent flow transformations that are directly or indirectly applied in other related technical field by using the content of the specification and accompanying drawings of this application shall fall within the protection scope of this application.

What is claimed is:

1. A remote automobile diagnostic method, the method being applicable to a device side, the device side being in communication connection with a to-be-diagnosed automobile, and the method comprising:
    transmitting a first connection request signal to a target terminal to establish a remote connection to the target terminal, the target terminal being any intelligent terminal having an automobile fault diagnosis function;
    acquiring parameter information of the to-be-diagnosed automobile, and transmitting the parameter information to the target terminal, so that the target terminal diagnoses the to-be-diagnosed automobile according to the parameter information;
    transmitting a second connection request signal to an operating terminal to establish a remote connection to the operating terminal, the operating terminal being configured to remotely control the device side; and
    receiving a control signal transmitted by the operating terminal, and performing a diagnosis action corresponding to the control signal, so that the operating terminal controls the device side according to the control signal;
    acquiring diagnosis data during a remote diagnosis of the to-be-diagnosed automobile by the target terminal according to the parameter information within a preset time period, and determining whether the target terminal is capable of completing the remote diagnosis of the to-be-diagnosed automobile according to the diagnosis data, the diagnosis data includes a network delay value and a diagnostic communication protocol followed by the to-be-diagnosed automobile;
    receiving a diagnosis result fed back by the target terminal if the target terminal is capable of completing the remote diagnosis of the to-be-diagnosed automobile, so that the target terminal completes the remote diagnosis of the to-be-diagnosed automobile; and
    disconnecting the remote connection with the target terminal if the target terminal is incapable of completing the remote diagnosis of the to-be-diagnosed automobile, and the device side is controlled by the operating terminal to perform remote diagnosis on the to-be-diagnosed automobile.

2. The remote automobile diagnostic method according to claim 1, wherein after the step of transmitting the second connection request signal to the operating terminal to establish the remote connection to the operating terminal, the method further comprises:
    transmitting real-time communication data to the operating terminal, wherein the real-time communication data is composed of one or more pieces of text data, picture data, voice data, and video data; and
    receiving instant communication information fed back by the operating terminal according to the real-time communication data to establish a remote communication connection to the operating terminal.

3. A computer device, comprising a memory and a processor, wherein the memory stores a computer program, and the processor implements the remote automobile diagnostic method according to claim 2 when executing the computer program.

4. A non-transitory computer-readable storage medium, having a computer program stored thereon, wherein the remote automobile diagnostic method according to claim 2 is implemented when the computer program is executed by a processor.

5. The remote automobile diagnostic method according to claim 1, wherein transmitting the first connection request signal to the target terminal to establish the remote connection to the target terminal comprises:
    acquiring an online terminal list, wherein the online terminal list includes a plurality of online terminals;
    randomly selecting one online terminal from the online terminal list as the target terminal;
    transmitting connection request information to the target terminal;
    receiving order information fed back by the target terminal according to the connection request information, wherein the order information comprises a basic automobile information acquisition request, and merchant information, fee information, and a connection address corresponding to the target terminal; and
    determining whether the order information conforms to a preset condition, and establishing the remote connection to the target terminal according to the connection address corresponding to the target terminal if the order information conforms to the preset condition; or
    returning to randomly selecting one online terminal from the online terminal list as the target terminal if the order information does not conform to the preset condition.

6. A computer device, comprising a memory and a processor, wherein the memory stores a computer program, and the processor implements the remote automobile diagnostic method according to claim 5 when executing the computer program.

7. A non-transitory computer-readable storage medium, having a computer program stored thereon, wherein the remote automobile diagnostic method according to claim 5 is implemented when the computer program is executed by a processor.

8. The remote automobile diagnostic method according to claim 1, wherein acquiring the diagnosis data during the remote diagnosis of the to-be-diagnosed automobile by the target terminal according to the parameter information within the preset time period, and determining whether the target terminal is capable of completing the remote diagnosis of the to-be-diagnosed automobile according to the diagnosis data comprises:

acquiring a network delay value of the remote connection to the target terminal within the preset time period;

determining whether the network delay value is greater than a preset delay threshold;

determining that the remote network connection to the target terminal is unstable if the network delay value is greater than the preset delay threshold;

acquiring the diagnostic communication protocol followed by the to-be-diagnosed automobile, and determining whether the diagnostic communication protocol is a preset communication protocol; and determining that the target terminal is incapable of completing the remote diagnosis of the to-be-diagnosed automobile, if the diagnostic communication protocol followed by the to-be-diagnosed automobile is the preset communication protocol and/or if the remote network connection to the target terminal is determined to be unstable.

9. A computer device, comprising a memory and a processor, wherein the memory stores a computer program, and the processor implements the remote automobile diagnostic method according to claim 8 when executing the computer program.

10. A non-transitory computer-readable storage medium, having a computer program stored thereon, wherein the remote automobile diagnostic method according to claim 8 is implemented when the computer program is executed by a processor.

11. The remote automobile diagnostic method according to claim 1, wherein transmitting the second connection request signal to the operating terminal to establish the remote connection to the operating terminal comprises:

acquiring a session address and a communication address;

transmitting the session address and the communication address to the operating terminal;

receiving remote response data fed back by the operating terminal according to the session address and the communication address; and establishing the remote connection to the operating terminal according to the remote response data.

12. A computer device, comprising a memory and a processor, wherein the memory stores a computer program, and the processor implements the remote automobile diagnostic method according to claim 11 when executing the computer program.

13. A non-transitory computer-readable storage medium, having a computer program stored thereon, wherein the remote automobile diagnostic method according to claim 11 is implemented when the computer program is executed by a processor.

14. The remote automobile diagnostic method according to claim 1, wherein receiving the control signal transmitted by the operating terminal, and performing the diagnosis action corresponding to the control signal comprises:

receiving the control signal transmitted by the operating terminal to obtain an adjustment instruction for the to-be-diagnosed automobile;

performing a diagnosis action corresponding to the adjustment instruction on the to-be-diagnosed automobile, wherein the diagnosis action includes selection of a diagnosis parameter and execution of a diagnosis event;

selecting a corresponding diagnosis parameter or option on a display interface of the device side when the diagnosis action is the selection of the diagnosis parameter, and transmitting a diagnosis instruction corresponding to the execution of the diagnosis event to the to-be-diagnosed automobile when the diagnosis action is the execution of the diagnosis event; and acquiring a diagnosis result of the to-be-diagnosed automobile to complete the remote diagnosis of the to-be-diagnosed automobile.

15. A computer device, comprising a memory and a processor, wherein the memory stores a computer program, and the processor implements the remote automobile diagnostic method according to claim 14 when executing the computer program.

16. A computer device, comprising a memory and a processor, wherein the memory stores a computer program, and the processor implements the remote automobile diagnostic method according to claim 1 when executing the computer program.

17. A non-transitory computer-readable storage medium, having a computer program stored thereon, wherein the remote automobile diagnostic method according to claim 1 is implemented when the computer program is executed by a processor.

* * * * *